United States Patent [19]

Sugyo et al.

[11] Patent Number: 5,415,941
[45] Date of Patent: May 16, 1995

[54] MAGNETIC RECORDING MEDIUM COMPRISING MAGNETIC PARTICLES AND A SPECIFIED POLYURETHANE RESIN

[75] Inventors: Yasunobu Sugyo, Iwakuni; Haruhiko Narusawa; Takeshi Yatsuka, both of Ohtsu, all of Japan

[73] Assignee: Toyo Boseki Kabushiki Kaisha, Osaka, Japan

[21] Appl. No.: 810,952

[22] Filed: Dec. 19, 1991

[30] Foreign Application Priority Data

Dec. 25, 1990 [JP] Japan ................................. 2-414196
Mar. 20, 1991 [JP] Japan ................................. 3-081598

[51] Int. Cl.⁶ ............................................. G11B 5/00
[52] U.S. Cl. ........................ 428/425.9; 428/694 BU; 428/694 BL; 428/900; 252/62.54
[58] Field of Search .................... 428/425.9, 694, 900, 428/694 BU, 694 BL; 252/62.54

[56] References Cited

U.S. PATENT DOCUMENTS

| | | | |
|---|---|---|---|
| 4,855,377 | 8/1989 | Yokota et al. | 528/25 |
| 5,045,622 | 9/1991 | Kohno et al. | 528/48 |
| 5,124,424 | 6/1992 | Endo et al. | 528/48 |
| 5,178,952 | 1/1993 | Yamamoto | 428/425.8 |

FOREIGN PATENT DOCUMENTS 0343576 11/1989 European Pat. Off. .
62-034326 2/1987 Japan .
2-000618 1/1990 Japan .

*Primary Examiner*—Stevan A. Resan
*Attorney, Agent, or Firm*—Leydig, Voit & Mayer, Ltd.

[57] ABSTRACT

A magnetic recording medium comprise a non-magnetic support and a magnetic layer formed thereon which is made of a composition comprising ferromagnetic particles and a resinous binder. The resinous binder comprises a polyurethane resin containing at least a high molecular polyol (A) and a diisocyanate (B) as its constituents. The high molecular polyol (A) comprises a polyol ($a_1$) having a glass-transition temperature of 20° C. or more and having a number average molecular weight in the range of 500 to 10,000, and the polyurethane resin has at least one hydroxyl group at its molecular terminals and the urethane bond concentration of the polyurethane resin is in the range of 500 to 1,500 equivalents/$10^6$ g.

1 Claim, No Drawings

MAGNETIC RECORDING MEDIUM COMPRISING MAGNETIC PARTICLES AND A SPECIFIED POLYURETHANE RESIN

BACKGROUND OF THE INVENTION

1. Field of the Invention

The present invention relates to a magnetic recording medium such as a magnetic tape and a magnetic disk. More particularly, it relates to a magnetic recording medium which uses a polyurethane resin having excellent properties, as a resinous binder used in a magnetic layer formed on a non-magnetic support.

2. Description of the Prior Art

In general, magnetic recording media such as magnetic tapes are produced by applying a magnetic coating composition to a polyethylene terephthalate film. The magnetic coating composition is usually prepared by dispersing needle-like magnetic particles having a long axis with a length of 1 μm or less in a solution of a resinous binder together with appropriate additives such as dispersing agents, lubricating agents, and antistatic agents.

The resinous binders used in the magnetic recording media are required, not only to yield excellent dispersibility, filling efficiency, and orientation of magnetic particles, but also to provide the magnetic layer with excellent durability, abrasion resistance, heat resistance, and adhesion to the non-magnetic support. Thus, the resinous binders play a very important role. Examples of conventional resinous binders which have been hitherto used include vinyl chloride/vinyl acetate copolymers, vinyl chloride/vinyl acetate/vinyl alcohol copolymers, vinyl chloride/vinylidene chloride copolymers, polyurethane resins, polyester resins, acrylonitrile/butadiene copolymers, nitrocellulose, cellulose acetate butyrate, epoxy resins, and acrylic resins.

In the magnetic recording media, in order to improve the S/N ratio (signal/noise ratio) and realize a high recording density, a high orientation and a smooth surface of the magnetic layer by filling more finely ground magnetic particles in the magnetic layer, or an adoption of magnetic particles which are hardly dispersible such as metal particles and barium ferrite particles have been tried in order to achieve these ends. Because of this, resinous binders which have satisfactory dispersibility are required. Moreover, in order to make the surface of the magnetic layer smooth, satisfactory running durability is required for resinous binders.

In addition, the above-mentioned demand for magnetic recording media is increasing along with the recent improvement of magnetic recording technique. Therefore, in actuality, the conventional polyurethane resin cannot satisfy the demand.

SUMMARY OF THE INVENTION

The magnetic recording medium of this invention, which overcomes the above-discussed and numerous other disadvantages and deficiencies of the prior art, comprises a non-magnetic support and a magnetic layer formed thereon which is made of a composition comprising ferromagnetic particles and a resinous binder, wherein the resinous binder comprises a polyurethane resin containing at least high molecular polyol (A) end a diisocyanate (B) as its constituents, the high molecular polyol (A) comprises a polyol (a1) having glass-transition temperature of 20° C. or more and having e number average molecular weight in the range of 500 to 10,000, and the polyurethane resin has at least one hydroxyl group at its molecular terminals and the urethane bond concentration of the polyurethane resin is in the range of 500 to 1,500 equivalents/$10^6$ g.

In a preferred embodiment, the polyurethane resin further contains a low molecular compound (C) as a constituent having a number average molecular weight of less than 500, and having at least two functional groups in its molecules, capable of reacting with en isocyanate.

In a preferred embodiment, the content of the polyol (a1) is 30% by weight or more in the high molecular polyol (A) of the polyurethane resin.

In a preferred embodiment, the polyurethane resin has at least one hydrophilic polar group selected from the group consisting of

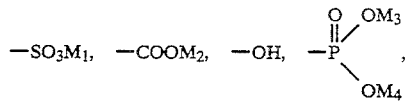

a tertiary amino group, a quarternary ammonium group, and a sulfobetain group, wherein $M_1$, $M_2$, and $M_3$ are independently a hydrogen atom or an alkali metal, and $M_4$ is a hydrogen atom, an alkali metal or a hydrocarbon group.

In a preferred embodiment, the polyurethane resin has the hydrophilic polar group in an amount of 10 to 300 equivalents/$10^{\neq l}$ g.

In a preferred embodiment, the polyurethane resin has the —$SO_3M_1$ group.

In a preferred embodiment, the polyurethane resin has the —$SO_3M_1$ group in an amount of 30 to 200 equivalents/$10^6$ g.

In a preferred embodiment, the high molecular polyol (A) of the polyurethane resin at least comprises the polyol (a1) and a polyol (a2) having a glass-transition temperature of −20° C. or less, and the content ratio of the polyol (a1) to the polyol (a2) is in the range of 90:10 to 30:70.

In a preferred embodiment, the number average molecular weight of the high molecular polyol (A) of the polyurethane resin is in the range of 500 to 5,000.

In a preferred embodiment, the polyurethane resin contains the polyol (a2) at, at least, one of its molecular terminals.

In a preferred embodiment, the polyurethane resin contains the low molecular compound (C) at, at least, one of its molecular terminals, the compound (C) being bonded to the polyol (a2) via the diisocyanate in the Polyurethane resin.

In a preferred embodiment, the polyol (a1) is a polyester polyol containing an aromatic dicarboxylic acid as its acid component.

In a preferred embodiment, the urethane bond concentration of the polyurethane resin is in the range of 800 to 1,200 equivalents/$10^6$ g.

Thus, the invention described herein makes possible the objectives of: (1) providing a magnetic recording medium which comprises magnetic particles excellent in dispersibility; and (2) providing a magnetic recording medium which has excellent running durability.

DESCRIPTION OF THE PREFERRED EMBODIMENTS

The present invention will be described in detail below.

A resinous binder which is comprised in the composition of a magnetic layer of a magnetic recording medium comprises e polyurethane resin. This polyurethane resin contains at least a high molecular polyol (A) and e diisocyanate (B) as its constituents.

In the present invention, a polyol ($a_1$) having a glass-transition temperature of 20° C. or more is an essential component for the high molecular polyol (A). When a polyol having a glass-transition temperature of less than 20° C. is used, the resulting polyurethane resin has poor abrasion resistance and toughness, so that the abrasion resistance and running durability of the magnetic recording medium obtained become poor. Moreover, it is preferred that a polyol ($a_2$) having a glass-transition temperature of −20° C. or less is used together with the polyol ($a_1$). When a polyol having a glass-transition temperature of more than −20° C. is used, reactivity of the molecular terminal of the resulting polyurethane resin with a general hardening agent is decreased, so that the abrasion resistance and running durability of the magnetic recording medium obtained tend to become poor.

Examples of the polyol ($a_1$) include aromatic polyester polyols containing an aromatic dicarboxylic acid as its main dicarboxylic acid component, polyester polyols containing an aromatic dicarboxylic acid and an aliphatic dicarboxylic acid as its dicarboxylic acid components, and aromatic polyester polyols with a lactone component added thereto. Moreover, examples of the polyol ($a_2$) include aliphatic polyester polyols containing an aliphatic dicarboxylic acid as its main dicarboxylic acid component, polycaprolactone polyols, and polyether polyols.

Examples of dicarboxylic acid components of the aromatic polyester polyol include aromatic dicarboxylic acids such as terephthalic acid, isophthalic acid, orthophthalic acid, 1,5-naphthalic acid, 2,6-naphthalic acid, 4,4'-diphenyldicarboxylic acid, and 4,4'-diphenyletherdicarboxylic acid; aromatic oxycarboxylic acids such as p-oxybenzoic acid and p-(hydroxy ethoxy)benzoic acid. Examples of the dicarboxylic acid components of the aliphatic polyester polyol include aliphatic dicarboxylic acids such as succinic acid, adipic acid, azelaic acid, sebacic acid, and dodecane-dicarboxylic acid. The aromatic dicarboxylic acid, the aromatic oxycarboxylic acid, and the like can be used in the range of the glass transition temperature of the polyol not exceeding −20° C.

Examples of glycol components of the polyester polyol include ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,3-pentanediol, cyclohexanedimethanol, ethylene oxide adducts of bisphenol A and propylene oxide adducts of bisphenol A, ethylene oxide adducts of bisphenol A hydride, and propylene oxide adducts of bisphenol A hydride.

Besides the above-described components, the polyester polyols may contain other components such as dicarboxylic acids or glycols having at least one hydrophilic polar group selected from the group consisting of

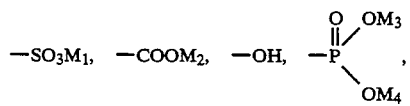

a tertiary amino group, and a quarternary ammonium salt group. The polyurethane resin comprising the polyester polyol containing the above-mentioned dicarboxylic acid component or the glycol component as the high molecular polyol (A) is effective for significantly improving the dispersibility of inorganic particles such as magnetic particles, abrasives, carbon black, and the like. $M_1$, $M_2$ and $M_3$ are independently a hydrogen atom or an alkali metal. $M_4$ is a hydrogen atom, an alkali metal, or a hydrocarbon group. Among the hydrophilic polar groups, $-SO_3 M_1$ is preferred, and more particularly it is preferred that $M_1$ is an alkali metal. Examples of dicarboxylic acid components and glycol components having such e hydrophilic polar group include 5-sodium sulfoisophthalic acid, 5-potassium sulfoisophthalic acid, sodium sulfoterephthalic acid, 2-sodiumsulfo-1,4-butanediol, and 2,5-dimethyl-3-sodiumsulfo-2,5-hexanediol.

It is preferred that the hydrophilic polar group is contained in the polyurethane resin in an amount of 10 to 300 equivalents/$10^6$ g, more preferably 30 to 200 equivalents/$10^6$ g, and most preferably 30 to 150 equivalents/$10^6$ g. When the hydrophilic polar group is in an amount of less than 10 equivalents/$10^6$g, the dispersibility of magnetic particles and the like of the resulting polyurethane resin sometimes become insufficient. In contrast, when the hydrophilic polar group is in an amount of more than 300 equivalents/$10^6$ g, the cohesion of the resulting polyurethane resin becomes too high, so that the dispersibility of the magnetic particles and the like tends to become poor.

Moreover, compounds having three or more functional groups such as trimellitic acid anhydride, glycerine, trimethylolpropane, and pentaerythritol may be used as a part of the raw materials for the polyester polyols, provided that the properties such as solubility of organic solvent of the polyurethane resin and workability of coating are not damaged.

An example of a polycaprolactone polyocaprolactone polyol component includes ⊖-caprolactone polyadduct, and examples of polyether polyol components include polyethylene glycol, polypropylene glycol, and polytetramethylene glycol.

It is preferred that: the amount of the polyol ($a_1$) used is 30% by weight or more in the high molecular polyol (A). When the amount of the polyol ($a_1$) used is less than 30% by weight, the toughness and abrasion resistance of the resulting polyurethane resin tend to become poor. Therefore, the abrasion resistance and running durability of the resulting magnetic recording medium tend to become poor.

Moreover, when the polyol ($a_1$) and the polyol ($a_2$) are used together, the weight ratio of the polyol ($a_1$) to the polyol ($a_2$) is preferably in the range of 90:10 to 30:70, more preferably 85:15 to 40:60. When the ratio of the polyol ($a_1$) is less than 30, the polyurethane has decreased mechanical physical properties and degraded characteristics such as toughness and abrasion resistance, so that the abrasion resistance and running durability of the resulting magnetic recording medium tend to become poor. When the ratio of the polyol ($a_1$) is more than 90, the polyol ($a_2$) used at the molecular terminals of the polyurethane becomes insufficient, so that the reactivity of the polyurethane resin with a general hardening agent used in the magnetic recording medium decreases. Therefore, the abrasion resistance and running durability of the resulting magnetic recording medium tend to become poor.

The number average molecular weight of the high molecular polyol (A) is in the range of 500 to 10,000, preferably 500 to 5,000. When the number average molecular weight of the high molecular polyol (A) is less than 500, the urethane bond concentration of the resulting polyurethane resin becomes too high, so that the dispersibility of magnetic particles and the like, abrasion resistance, running durability at a low temperature, and the like of the resulting magnetic recording medium become poor. In contrast, when the number average molecular weight is more than 10,000, the abrasion resistance, toughness, and the like of the resulting polyurethane resin become poor, so that the abrasion resistance and the running durability of the resulting magnetic recording medium become poor.

Examples of the diisocyanate (B) which is a constituent of the polyurethane resin include 2,4-tolylene diisocyanate, 2,6-tolylene diisocyanate, p-phenylene diisocyanate, diphenylmethane diisocyanate, m-phenylene diisocyanate, hexamethylene diisocyanate, tetramethylene diisocyanate, 3,3'-dimethoxy-4,4'-biphenylene diisocyanate, 2,6-naphthalene diisocyanate, 3,3'-dimethyl-4,4'-biphenylene diisocyanate, 4,4'-diphenylene diisocyanate, 4,4'-diisocyanate diphenyl ether, 1,5-naphthalene diisocyanate, m-xylylene diisocyanate, 1,3-diisocyanate methylcyclohexane, 1,4-diisocyanatemethylcyclohexane, 4,4'-diisocyanatecyclohexane, 4,4'-diisocyanatecyclohexylmethane, isophorone diisocyanate, and 4,4'-diphenylmethane diisocyanate.

If necessary, the polyurethane resin contains as its constituent a low molecular compound (C) having at least two functional groups in its molecule, capable of reacting with an isocyanate and having a number average molecular weight of less than 500. This low molecular compound (C) can be used for regulating the urethane bond concentration of the polyurethane resin. It is effective for improving the reactivity with the general hardening agent that the low molecular compound (C) is a compound having at least three functional groups in its molecule, capable of reacting with an isocyanate. It is preferred that at least one of the functional groups is a hydroxyl group. Examples of the low molecular compound (C) include straight chain glycols such as ethylene glycol, 1,3-propylene glycol, 1,6-hexanediol, cyclohexanedimethanol, xylylene glycol, diethylene glycol, triethylene glycol, and ethylene oxide adducts of bisphenol A; branch glycols such as propylene glycol, neopentyl glycol, 1,2-butanediol, 1,3-butanediol, 2,2,4-trimethyl-l,3-pentanediol, propylene oxide adducts of bisphenol A; amino alcohols such as N-methylethanolamine, monoethanolamine, and diethanolamine; polyols such as trimethylol propane, glycerine, pentaerythritol, and dipentaaerythritol; and $\ominus$-caprolactone adducts of one of these polyols.

The polyurethane resin has an urethane bond concentration in the range of 500 to 1,500 equivalents/$10^6$ g, preferably 800 to 1,200 equivalents/$10^6$ g. The urethane bond causes a strong interaction between the resins because of its hydrogen bond. As the urethane bond concentration becomes higher, the toughness, abrasion resistance, and the like of the resulting urethane resin improve, whereas the dispersibility of the magnetic particles are decreased. When the urethane bond concentration is less than 500 equivalents/$10^6$ g, the abrasion resistance and toughness of the resulting polyurethane are decreased. Thus, the abration resistance and running durability of the resulting magnetic recording medium become poor. In contrast, when the urethane bond concentration is more than 1,500 equivalents/$10^6$ g, the dispersibility of the magnetic particles and the like of the resulting polyurethane resin is decreased.

The polyurethane resin has at least one hydroxyl group at its molecular terminals, preferably at both terminals. Moreover, it is preferred that the polyurethane resin contains the polyol ($a_2$) or the low molecular compound (C) at, at least, one of its molecular terminals, more preferably at both terminals. When the polyurethane resin contains the low molecular compound (C) at, at least, one of its molecular terminals, it is preferred that the low molecular compound (C) is bonded to the polyol ($a_2$) via the diisocyanate (B). The polyurethane resin contains such a component at, at least, one of its molecular terminals, whereby the reactivity of the polyurethane resin with the general hardening agent used in the magnetic recording medium can be improved and the cross-linked density can be increased. Therefore, the toughness and abrasion resistance of the polyurethane resin can be prevented from decreasing due to the regulation of the urethane bond concentration, and sufficient running durability as the magnetic recording medium can be provided.

As a method for producing the polyurethane resin used in the present invention, there is the following polyaddition reaction method.

(1) A method comprising the steps of: reacting a component excluding the polyol ($a_2$) with the diisocyanate (B) to obtain a prepolymer having isocynate groups at its molecular terminals; and further reacting the prepolymer with polyol ($a_2$).

(2) A method comprising the steps of: reacting the polyol ($a_1$) with the diisocyanate (B) until the hydroxyl group of the polyol ($a_1$) disappears; adding the polyol ($a_2$) to the resulting reactant to obtain a prepolymer having isocynate groups at its molecular terminals; and reacting the resulting, suiting reactant with the low molecular compound (C).

(3) A method comprising the steps of: reacting the polyol ($a_2$) with the diisocyanate (B) to obtain a prepolymer having isocynate groups at its molecular terminals; adding the prepolymer to the polyol ($a_1$) under the condition that the number of hydroxyl groups of the polyol ($a_1$) is less than that of NCO groups in the prepolymer; and reacting the resulting reactant with the low molecular compound (C) or the polyol ($a_2$).

Among the above methods, (i) and (2) are preferred.

The above methods can be conducted under the condition that the raw materials are in a molten state or the raw materials are melted in the solution.

As a reaction catalyst, tin (II) dioctanoate, dibutyltindilaurate, triethylamine, or the like can be used.

A UV-ray absorbent, hydrolysis inhibitor, oxidization inhibitor, and the like can be added before, during, or after the production.

The number average molecular weight of the polyurethane resin used in the present invention is preferably in the range of 5,000 to 50,000, more preferably 10,000 to 40,000. When the number average molecular weight is less than 5,000, the mechanical strength of the polyurethane resin is decreased. When the number average molecular weight is more than 50,000, viscosity of the resulting polyurethane resin becomes too high, so that it is difficult to handle the polyurethane.

In the present invention, besides the polyurethane resin as a resinous binder, for the purpose of improving the regulation of flexibility, cold resistance, durability, and the like, it is preferred that other resins are added and/or a compound capable of cross-linking the polyurethane resin is mixed. Examples of other resins include vinyl chloride type resins, polyester type resins, cellulose type resins, epoxy resin, phenoxy resin, polyvinylbutyral, and acrylonitrile-butadiene copolymer.

Examples of the compound capable of cross-linking the polyurethane resin include polyisocyanate compounds, epoxy resin, melamine resin, and urea resin. Among them, polyisocyanate compounds are especially preferred.

Examples of the magnetic particles used in the magnetic layer of the magnetic recording medium of the present invention include $\gamma\text{-}Fe_2O_3$, mixed crystals of $\gamma\text{-}Fe_2O_3$ and $Fe_3O_4$, $CrO_2$, $Fe_2O_3$ or $Fe_3O_4$ coated with cobalt, barium ferrite, iron carbide, pure iron, and ferromagnetic alloy powders such as Fe-Co and Fe-Co-Ni alloys. Even if magnetic particles which have poor dispersibility, such as magnetic particles which are finely ground so as to have a surface area of BET 40 $m^2/g$ or more, alloy powders, or barium ferrite are used, they are especially effective when the polyurethane resin is used as a resinous binder.

If necessary, a plasticizer such as dibutyl phthalate and triphenyl phosphate; a lubricating agent such as sodium dioctylsulfosuccinate, t-butylphenol polyethylene ether, sodium ethylnaphthalenesulfonate, dilauryl succinate, zinc stearate, soybean oil lecithin, and silicone oil; or various kinds of antistatic agents can be added to the magnetic layer of the magnetic recording medium of the present invention.

The dispersibility of the magnetic particles becomes satisfactory by limiting the urethane bond concentration of the polyurethane resin used in the magnetic recording medium of the present invention to the range of 500 to 1,500 equivalents/$10^6$ g. Moreover, the polyol ($a_1$) having a glass-transition temperature of 20° C. or more is used as the high molecular polyol (A), whereby the toughness and abrasion resistance of the resulting polyurethane resin becomes satisfactory. Therefore, the abrasion resistance and running durability of the resulting magnetic recording medium become satisfactory.

Moreover, the following is preferred. The polyurethane further contains the low molecular compound (C) as its constituent having a number average molecular weight of-less than 500, and having at least two functional groups in is molecule, capable of reacting with an isocyanate. As the high molecular polyol (A), the polyol ($a_1$) having a glass-transition temperature of 20° C. or more and the polyol ($a_2$) having a glass-transition temperature of $-20°$ C. or less are used together. The polyurethane resin contains the polyol ($a_2$) or the low molecular compound (C) at, at least, one of its molecular terminals. When the polyurethane resin contains the low molecular compound (C) at, at least, one of its molecular terminals, the low molecular compound (C) is bonded to the polyol ($a_2$) via the diisocyanate compound.

The reactivity of the polyurethane resin with the general hardening agent used in the magnetic recording medium is improved and the cross-linked density is increased, since the polyurethane resin contains the polyol ($a_2$) or the low molecular compound (C) at, at least, one of its molecular terminals. Therefore, even though a polyurethane resin having poor toughness and abrasion resistance due to the decreased in the urethane bond concentration is used, a magnetic recording medium having sufficient abrasion resistance and running durability can be obtained.

EXAMPLES

The present invention will be described by way of illustrating examples.

In the present examples, as a high molecular polyol (A) of a polyurethane resin, polyester polyols (a) to (p) as shown in Table 1 were used. A glass-transition temperature of the polyester polyols (a) to (p) was measured at a rising temperature speed of 20° C. /min. by the use of a scanning differential calorimeter. A number average molecular weight of the polyester polyols (a) to (p) was measured as a converted value of a standard polystyrene, using a THF as a solvent by gel permeation chromatography.

TABLE 1

| High molecular polyol (A) | Composition (Molar ratio) | Number average molecular weight | Glass-transition temperature |
|---|---|---|---|
| Polyester Polyol a | TPA/IPA/SIPA/NPG/EG 49/49/2/60/40 | 2,500 | 47° C. |
| Polyester Polyol b | Bifunctional poly-ε-caprolactone | 2,000 | −35° C. |
| Polyester Polyol c | TPA/IPA/SIPA/NPG/HD 50/47/3/40/60/ | 4,000 | 25° C. |
| Polyester Polyol d | Trifunctional Poly-ε-caprolactone | 800 | −39° C. |
| Polyester Polyol e | AA/NPG/HD 100/40/60 | 2,000 | −29° C. |
| Polyester Polyol f | TPA/IPA/NPG/EG 40/60/50/50 | 2,000 | 50° C. |
| Polyester Polyol g | AA/NPG/HD/ 100/30/70 | 4,000 | −40° C. |
| Polyester Polyol h | TPA/IPA/AA/NPG/BD 25/25/50/40/60 | 2,000 | −18° C. |
| Polyester Polyol j | OPA/IPA/SIPA/EG/NPG 37/59/3/40/60 | 2,500 | 44° C. |
| Polyester Polyol k | TPA/IPA/SIPA/NPG/HD 45/45/10/40/60 | 2,000 | 25° C. |
| Polyester Polyol l | OPA/IPA/EG/NPG 40/60/50/50 | 2,500 | 45° C. |

TABLE 1-continued

| High molecular polyol (A) | Composition (Molar ratio) | Number average molecular weight | Glass-transition temperature |
| --- | --- | --- | --- |
| Polyester Polyol m | TPA/IPA/SIPA/NPG/HD 48/50/2/50/50 | 12,000 | 55° C. |
| Polyester Polyol n | AA/SIPA/NPG/BD 97/3/40/60 | 2,000 | −28° C. |
| Polyester Polyol p | poly-ε-caprolactone | 2,000 | −40° C. |

OPA: orthophthalic acid, IPA: isophthalic acid
SIPA: 5-sodium sulfoisophthalic acid, EG: ethylene glycol
NPG: neopentyl gylcol, HD: hexanediol, BD: butanediol
TPA: terephthalic acid, AA: adipic acid

Preparation 1

First, 60 parts by weight of the polyester polyol (a) sufficiently dried and one part by weight of neopentyl glycol (NPG) were dissolved in 133 parts by weight of toluene. To this mixture, 13 parts by weight of 4,4-diphenylmethane diisocyanate (MDI) was added and allowed to react at 90° C. for 4 hours to obtain a prepolymer having isocyanate groups at its terminals. 40 parts by weight of the dried polyester polyol (b) was added to the prepolymer thus obtained and allowed to react for 3 hours. Then, this reactant was diluted with 133 parts by weight of methyl ethyl ketone (MEK) to obtain a polyurethane resin (1). Here, the number of unreacted NCO groups of the prepolymer before the addition of the polyester polyol (b) was 20.9% based on the total number of NCO groups in MDI. A GPC analysis revealed that unreacted polyester polyol (a) was not present.

Preparation 2

First, 60 parts by weight of the polyester polyol (c) sufficiently dried was dissolved in 135 parts by weight of toluene. To this mixture, 15.5 parts by weight of MDI was added and allowed to react at 90° C. for 5 hours to obtain a prepolymer having isocyanate groups at its molecular terminals. 40 parts by weight of the dried polyester polyol (d) was added to the prepolymer thus obtained and allowed to react for 3 hours. Then, this reactant was diluted with 135 parts by weight of MEK to obtain a polyurethane resin (2). Here, the number of unreacted NCO groups of the prepolymer before the addition of the polyester polyol (c) was 31.7% based on the total number of NCO groups in MDI. A GPC analysis revealed that unreacted polyester polyol (c) was not present.

Preparation 3

First, 50 parts by weight of the polyester polyol (a) sufficiently dried was dissolved in 137 parts by weight of toluene. To this mixture, 15.9 parts by weight of MDI was added and allowed to react at 100° C. for 3 hours to obtain e prepolymer having isocyanate groups at its molecular terminals. 90 parts by weight of the dried polyester polyol (b) was added to the prepolymer thus obtained and allowed to react for 2 hours. Then, 2 parts by weight of trimethylolpropane (TMP) was added to this reactant and allowed to react for a further 2 hours, followed by dilution with 137 parts by weight of MEK of obtain a polyurethane resin (3). Here, the number of unreacted NCO groups of the prepolymer before the addition of the polyester polyol (b) was 21.5% based on the total number of NCO groups in MDI, and the number of unreacted NCO groups of the reactant before the addition of TMP was 8.4% based on the total number of unreacted NCO groups in MDI.

Preparations 4 to 11

Polyurethane resins (4) to (11) were obtained by the same method as in Preparations 1 to 3, using raw material compositions as shown in Table 2.

Comparative preparation 1

A polyurethane resin (12) was obtained in the same way as in Preparation 2 except that the polyester (g) was used in place of the polyester (d). The urethane bond concentration of the polyurethane resin (12) is out of the scope of the claims.

Comparative preparation 2

A polyurethane resin (13) was obtained in the same way as in Preparation 1 except that one part by weight of NPG was replaced by 10 parts by weight of NPG. The urethane bond concentration of the polyurethane resin (13) is out of the scope of the claims.

Comparative preparation 3

A polyurethane resin (14) was obtained in the same way as in Preparation 1 except that a polyester polyol (h) was used in place of the polyester polyol (a). The glass-transition temperature of the polyester polyol of the polyurethane resin (14) is out of the scope of the claims.

Comparative preparation 4

A polyurethane resin (15) was obtained by the method as shown in Table 2, using only a polyester polyol (m) as the high molecular polyol (A). The molecular weight of the polyester polyol of the polyurethane resin (15) is out of the scope of the claims.

The polyurethane resins obtained in Preparations 1 to 11 and Comparative preparations 1 to 4 were examined for the following characteristics. The results are shown in Table 2.

(1) Viscosity of polyurethane resin solution: measured at 25° C. under the conditions that a solid content concentration was 30%, end methyl ethyl ketone end toluene were used in the weight ratio of 1:1 as a solvent.

(2) Number average molecular weight: measured as a converted value of a standard polystyrene using a THF as a solvent by gel permeation chromatography.

(3) Urethane bond concentration (equivalents/$10^6$ g): measured from the used materials.

(4) Metal sulfonate group concentration (equivalents/$10^6$ g): measured from the used materials.

TABLE 2

| Polyurethane resin | (1) | (2) | (3) | (4) | (5) | (6) | (7) | (8) | (9) | (10) | (11) |
|---|---|---|---|---|---|---|---|---|---|---|---|
| Composition of raw material | | | | | | | | | | | |
| High molecular polyol (A) (parts by weight) | a 60 b 40 | c 60 d 40 | a 50 b 50 | a 70 e 30 | c 70 e 30 | c 60 d 40 | f 50 d 50 | j 100 | j 90 n 10 | k 50 l 50 | j 80 p 20 |
| Diisocyanate (B) (parts by weight) | MDI 13 | MDI 15.5 | MDI 15.5 | MDI 26.5 | MDI 8.5 | TDI 10 | MDI 15.5 | MDI 15 | MDI 11 | MDI 13 | MDI 16 |
| Low molecular compound (C) (parts by weight) | NPG 1 | None | TMP 2 | HPN 13 | None | NPG 4 | TMP 2 | NPG 2 | None | HPN 8 | NPG 2 |
| Method for production | a+NPG +MDI →b | c+MDI →b→ →d | a+MDI →b→ TMP | a+HPN +MDI →e | c+MDI →e | c+TDI →d→ NPG | f+MDI →d→ TMP | j+MDI →NPG | j+n +MDI | k+l +TDI →HPN | j+p +MDI →NPG |
| Characteristics of polyurethane | | | | | | | | | | | |
| Viscosity of solution (poise) | 30 | 25 | 50 | 75 | 110 | 550 | 7.5 | 70 | 200 | 500 | 50 |
| Number average molecular weight | 32,000 | 25,000 | 38,000 | 28,000 | 28,000 | 12,000 | 32,000 | 30,000 | 35,000 | 18,000 | 39,000 |
| Urethane bond concentration (equivalents/$10^6$ g) | 910 | 1,070 | 1,050 | 1,500 | 620 | 700 | 1,050 | 1,030 | 790 | 1,230 | 1,080 |
| Concentration of Sulfonic group (equivalents/$10^6$ g) | 41 | 54 | 33 | 39 | 68 | 54 | 0 | 100 | 106 | 143 | 79 |

| Polyurethane resin | (12) | (13) | (14) | (15) |
|---|---|---|---|---|
| Composition of raw material | | | | |
| High molecular polyol (A) (parts by weight) | c 60 g 40 | a 60 h 40 | h 60 b 40 | m 100 |
| Diisocyanate (B) (parts by weight) | MDI 6.5 | MDI 35 | MDI 13 | TDI 9 |
| Low molecular compound (C) (parts by weight) | None | NPG 10 | NPG 1 | HPN 10 |
| Method for preparation | c+MDI →g | a+NPG +MDI →b | h+NPG +MDI →b | m+TDI →HPN |
| Characteristics of polyurethane | | | | |
| Viscosity of solution (poise) | 50 | 18 | 33 | 800 |
| Number average molecular weight | 35,000 | 24,000 | 32,000 | 35,000 |
| Urethane bond concentration (equivalents/$10^6$ g) | 480 | 1,930 | 910 | 870 |
| Concentration of Sulfonic group (equivalents/$10^6$ g) | 60 | 32 | 0 | 60 |

NPG: Neopentyl glycol, HPN: Neopentyl glycol hydroxypivalate
TMP: Trimethylolpropane, MDI: 4,4'-diphenylmethane diisocyanate
TDI: 1,4-tolylenediisocyanate

EXAMPLE 1

The following ingredients were charged to a ball mill and dispersed for 24 hours. Then, one part by weight of stearic acid, one part by weight of butyl stearate as a lubricating agent, 6 parts by weight of Coronate L (Japan Polyurethan Industry Co., Ltd.) as a curing agent were added to the mixture. The mixture was further dispersed for one hour to form a magnetic coating composition. The magnetic coating composition was then applied to a polyethylene terephthalate film with a thickness of 12 μm, resulting in a dry thickness of 4 μm. While applying a magnetic field of 2,000 gauss, the film was dried. After allowing the film to stand at 50° C. for 48 hours, the film was slit in a ½ inch width to form a magnetic tape.

The weight ratio of the magnetic particles to the resinous binder is 4:1, and the weight ratio of the resinous binder to the curing agent is 5:1.

| Ingredients | Parts by weight |
|---|---|
| Polyurethane resin (1) (30% solids in a mixed solvent of methyl ethyl ketone and toluene in the content ratio of 1:1) | 100 |
| Ferromagnetic iron oxide powder (Co-γ-$Fe_2O_3$ type BET 45 $m^2/g$) | 120 |
| Alumina oxide powder (average | 5 |

-continued

| Ingredients | Parts by weight |
|---|---|
| particle size: 0.2 μm) | |
| Cyclohexanone | 100 |
| Methyl ethyl ketone | 50 |
| Toluene | 50 |

EXAMPLES 2 TO 8 AND COMPARATIVE EXAMPLES 1 to 3

Magnetic tapes were obtained in the same way as in Example 1 except that a resinous binder shown in Table 3 was used in place of the polyurethane resin (1).

The magnetic tapes obtained in Examples 1 to 8 and Comparative examples 1 to 3 were examined for the following characteristics. The results are shown in Table 3.

(1) Glossiness of magnetic layer: measured as 60° o glossiness.
(2) Squareness ratio: measured as a ratio of saturated magnetic flux density to residual magnetic flux density.
(3) Abrasion resistance of magnetic layer: The magnetic tape was run in a commercially available S-VHS video player, and scratches in the .magnetic layer after being run 100 times at 10° C. and at 40° C., respectively were observed. A degree of the scratches was evaluated as one of the following six grades.
6: Almost no scratches
5: A few scratches
4: Serious scratches
3: Extremely serious scratches (Scratches are not observed on the surface of the PET film)
2: Extremely serious scratches (A few scratches are observed on the surface of the PET film)
1: Extremely serious scratches (A great number of scratches are observed on the surface of the PET film)
(4) Extraction rate (%): Hardenability of the magnetic layer was measured as an index for running durability of the magnetic tape. The hardenability of the magnetic layer was represented as an extraction rate when the magnetic tape was immersed in methyl ethyl ketone at 25° C. for 24 hours. The methyl ethyl ketone in which the magnetic tape was immersed was measured by GPC, and the extraction ratio was represented as the weight ratio of the extraction to the resin on the magnetic tape.

TABLE 3

| | Resinous binder | Glossiness of magnetic layer | Squareness ratio | Abrasion resistance (10° C.) | Abrasion resistance (40° C.) | Extraction rate (%) |
|---|---|---|---|---|---|---|
| Example | | | | | | |
| 1 | Polyurethane resin (1) | 99 | 0.85 | 6 | 6 | 18 |
| 2 | Polyurethane resin (2) | 95 | 0.83 | 5 | 5 | 25 |
| 3 | Polyurethane resin (1)/ Vinyl chloride type copolymer = 1/1 | 98 | 0.85 | 6 | 6 | 19 |
| 4 | Polyurethane resin (3)/ Vinyl chloride type copolymer = 1/1 | 95 | 0.85 | 6 | 5 | 22 |
| 5 | Polyurethane resin (4)/ Vinyl chloride type copolymer = 1/1 | 92 | 0.84 | 5 | 5 | 22 |
| 6 | Polyurethane resin (5)/ Vinyl chloride type copolymer = 1/1 | 100 | 0.86 | 6 | 6 | 17 |
| 7 | Polyurethane resin (6)/ Vinyl chloride type copolymer = 1/1 | 90 | 0.83 | 5 | 5 | 27 |
| 8 | Polyurethane resin (7)/ Vinyl chloride type copolymer = 1/1 | 82 | 0.80 | 4 | 4 | 35 |
| Comparative example | | | | | | |
| 1 | Polyurethane resin (12) | 98 | 0.85 | 2 | 1 | 70 |
| 2 | Polyurethane resin (13)/ Vinyl chloride type copolymer = 1/1 | 79 | 0.80 | 4 | 3 | 54 |
| 3 | Polyurethane resin (14)/ Vinyl chloride type copolymer = 1/1 | 91 | 0.82 | 2 | 1 | 68 |

Vinyl chloride type copolymer: Vinyl chloride-vinyl acerate-glycidyl methacrylate copolymer produced by Nihonzeon co., Ltd., MR-110

EXAMPLES 9 TO 12 AND COMPARATIVE EXAMPLE 4

Magnetic tapes were obtained in the same way as in Example 1 except that the resinous binder shown in Table 4 was used in place of the polyurethane resin (1). The magnetic tapes obtained in Examples 9 to 12 and Comparative example 4 were examined for the following characteristics. The results are shown in Table 4. The glossiness of the magnetic layer, squareness ratio, and abrasion resistance of the magnetic tape were measured in the same way as described above.

The resistance to abrasion of the magnetic layer was measured as follows: The magnetic tape was run in a commercially available S-VHS video player, and scratches in the magnetic layer after being run 100 and 200 times at 10° C., respectively were observed. A degree of the scratches was evaluated as the following six grades.
6: Almost no scratches
5: A few scratches
4: Serious scratches
3: Extremely serious scratches (Scratches are not observed on the surface of the PET film)

2: Extremely serious scratches (A few scratches are observed on the surface of the PET film)

1: Extremely serious scratches (A great number of scratches are observed on the surface of the PET film)

TABLE 4

|  | Resinous binder | Glossness of magnetic layer | Squareness ratio | Abrasion resistance (10° C.) 100 times | Abrasion resistance (10° C.) 200 times | Extraction rate (%) |
| --- | --- | --- | --- | --- | --- | --- |
| Example | | | | | | |
| 9 | Polyurethane (8) | 133 | 0.86 | 5 | 3 | 25 |
| 10 | Polyurethane (9) | 129 | 0.86 | 6 | 5 | 22 |
| 11 | Polyurethane (10)/ vinyl chloride type copolymer = 1/1 | 128 | 0.86 | 5 | 3 | 18 |
| 12 | Polyurethane (11)/ vinyl chloride type copolymer = 1/1 | 130 | 0.86 | 5 | 3 | 26 |
| Comparative example | | | | | | |
| 4 | Polyurethane( 15) | 113 | 0.85 | 2 | 1 | 70 |

Vinyl chloride type copolymer: Vinyl chloride-vinyl acerate-glycidyl methacrylate copolymer produced by Nihonzeon co., Ltd., MR-110

As described above, in the magnetic recording medium of the present invention, a polyurethane resin excellent in dispersibility, toughness, and abrasion resistance is comprised in a magnetic layer as a resinous binder. Thus, the magnetic recording medium excellent in dispersibility, abrasion resistance, and running durability can be provided.

It is understood that various other modifications will be apparent to and can be readily made by those skilled in the art without departing from the scope and spirit of this invention. Accordingly, it is not intended that the scope of the claims appended hereto be limited to description as set forth herein, but rather that the claims be construed as encompassing all the features of patentable novelty that reside in the present invention, including all features that would be treated as equivalents thereof by those skilled in the art to which this invention pertains.

What is claimed is:

1. A magnetic recording medium comprising a nonmagnetic support and a magnetic layer formed thereon, said magnetic layer comprising ferromagnetic particles and a resinous binder;

wherein said resinous binder comprises a polyurethane resin containing at least a high molecular weight polyol (A) having a number average molecular weight in the range of from about 500 to about 10,000 and a diisocyanate (B) as its constituents;

said high molecular weight polyol (A) comprising about 30% or greater by weight of a first polyester polyol ($a_1$) containing an aromatic dicarboxylic acid as its acid component and having a glass-transition temperature of 20° C. or more and having a number average molecular weight in the range of 500 to 10,000 and a second polyol ($a_2$) having a glass-transition temperature of −20° C. or less, the content ratio of the polyol ($a_1$) to the polyol ($a_2$) being in the range of 90:10 to 30:70, wherein said polyurethane resin optionally contains a low molecular weight compound (C) having a number average molecular weight of less than 500;

wherein said polyurethane resin has at least one hydrophilic polar group consisting of $-SO_3M_1$ wherein $M_1$ is a hydrogen atom or an alkali metal;

wherein said polyurethane resin has hydroxyl groups at both of its molecular terminals, at least one of said hydroxyl groups being derived from the second polyol ($a_2$) or the low molecular weight compound (C), and wherein said polyurethane resin has a urethane bond concentration in the range of 500 to 1,500 equivalents/$10^6$ g.

* * * * *

UNITED STATES PATENT AND TRADEMARK OFFICE
CERTIFICATE OF CORRECTION

PATENT NO. : 5,415,941
DATED : MAY 16, 1995
INVENTOR(S) : YASUNOBU SUGYO, HARUHIKO NARUSAWA AND TAKESHI YATSUKA

It is certified that error appears in the above-indentified patent and that said Letters Patent is hereby corrected as shown below:

Column 1, line 64, delete "end" and substitute therefor -- and --;

Column 1, line 67, after "more and having" delete "e" and substitute therefor -- a --;

Column 2, line 9, after "reacting with" delete "en" and substitute therefor -- an --;

Column 2, line 32, delete "10≠$^{1g}$" and substitute therefor -- $10^6 g$ --;

Column 2, lines 50 and 53, delete "a2" and substitute therefor -- $a_2$ --;

Column 2, line 54, delete "Polyurethane" and substitute therefor -- polyurethane --;

Column 3, line 9, after "(A) and" delete "e" and substitute therefor -- a --;

Column 4, line 20, after "having such" delete "e" and substitute therefor -- a --;

Column 4, lines 46-47, delete the second occurrence of "polyocaprolactone";

Column 4, line 47, delete "e" and substitute therefor -- $\epsilon$ --;

Column 4, line 51, after "that" delete ":";

Column 5, line 60, "dipentaaerythritol" should read -- dipentaerythritol --;

Column 5, line 60, delete "e" and substitute therefor -- $\epsilon$ --;

Column 9, line 64, after "of MEK" delete "of" and substitute therefor -- to --;

UNITED STATES PATENT AND TRADEMARK OFFICE
CERTIFICATE OF CORRECTION

PATENT NO. : 5,415,941
DATED : MAY 16, 1995
INVENTOR(S) : YASUNOBU SUGYO, HARUHIKO NARUSAWA AND TAKESHI YATSUKA

It is certified that error appears in the above-indentified patent and that said Letters Patent is hereby corrected as shown below:

Column 6, line 44, delete ", suiting";

Column 6, line 54, delete "(i)" and substitute therefor -- (1) --;

Column 7, line 22, delete "$Fe_2O_3$" and substitute therefor -- $\gamma$-$Fe_2O_3$ --;

Column 8, line 4, after "magnetic" delete ":";

Column 8, line 8, "of-less" should read -- of less --;

Column 8, Table 1, second column under the Heading "Composition (Molar ratio)", line 6, "50/47/3/40/60/" should read -- 50/47/3/40/60 --;

Column 8, Table 1, second column under the Heading "Composition (Molar ratio)", line 13, "AA/NPG/HD/" should read -- AA/NPG/HD --;

Column 8, line 28, after "decreased" delete "in the";

Column 9, lines 20-21, "4,4-diphenylmethane" should read -- 4,4'-diphenylmethane --;

Column 9, line 55, delete "15.9" and substitute therefor -- 15.5 --;

Column 9, line 57, after "obtain" delete "e" and substitute therefor -- a --;

Column 9, line 58, delete "90" and substitute therefor -- 50 --;

UNITED STATES PATENT AND TRADEMARK OFFICE
CERTIFICATE OF CORRECTION

PATENT NO. : 5,415,941
DATED : MAY 16, 1995
INVENTOR(S) : YASUNOBU SUGYO, HARUHIKO NARUSAWA AND TAKESHI YATSUKA

It is certified that error appears in the above-indentified patent and that said Letters Patent is hereby corrected as shown below:

Column 10, lines 58 and 59, delete "end" and substitute therefor -- and --;

Column 11, line 61, "Polyurethan" should read -- Polyurethane --;

Columns 11 and 12, Table 2, line 5, after "b 40" move each entry over one starting with "d 40" and from columns (2) to (11);

Column 12, Table 2 Continued, line 5, under Column (13), delete "h 40" and substitute therefor -- b 40 --;

Column 12, Table 2 Continued, first column, lines 12-13, "Method for preparation" should read -- Method for production --;

Column 13, line 50, after "60°" delete "o"; and

Column 13, lines 57-58, before "magnetic" delete ".".

Column 14, Table 3, and Column 15, Table 4, last line, "Nohonzeon co." should read -- Nihonzeon Co. --.

UNITED STATES PATENT AND TRADEMARK OFFICE
CERTIFICATE OF CORRECTION

PATENT NO. : 5,415,941
DATED : May 16, 1995
INVENTOR(S) : Yasunobu Sugyo, Haruhiko Narusawa and Takeshi Yatsuka It is certified that error appears in the above-indentified patent and that said Letters Patent is hereby corrected as shown below:

IN THE CLAIMS:

Column 16, lines 30 and 32, delete "a2" and substitute therefor --$a_2$--.

Signed and Sealed this

Nineteenth Day of March, 1996

BRUCE LEHMAN

Attest:

Attesting Officer

Commissioner of Patents and Trademarks